(12) United States Patent
Ohmi et al.

(10) Patent No.: US 9,133,951 B2
(45) Date of Patent: Sep. 15, 2015

(54) GASKET TYPE ORIFICE AND PRESSURE TYPE FLOW RATE CONTROL APPARATUS FOR WHICH THE ORIFICE IS EMPLOYED

(75) Inventors: Tadahiro Ohmi, Sendai (JP); Kouji Nishino, Osaka (JP); Ryousuke Dohi, Osaka (JP); Nobukazu Ikeda, Osaka (JP); Masaaki Nagase, Osaka (JP); Kaoru Hirata, Osaka (JP); Katsuyuki Sugita, Osaka (JP); Tsutomu Shinohara, Osaka (JP); Takashi Hirose, Osaka (JP); Tomokazu Imai, Osaka (JP); Toshihide Yoshida, Osaka (JP); Hisashi Tanaka, Osaka (JP)

(73) Assignees: Fujikin Incorporated, Osaka (JP); National University Corporation Tohoku University, Miyagi (JP)

( * ) Notice: Subject to any disclaimer, the term of this patent is extended or adjusted under 35 U.S.C. 154(b) by 1555 days.

(21) Appl. No.: 11/913,271

(22) PCT Filed: May 10, 2006

(86) PCT No.: PCT/JP2006/309368
§ 371 (c)(1),
(2), (4) Date: Feb. 12, 2009

(87) PCT Pub. No.: WO2007/023597
PCT Pub. Date: Mar. 1, 2007

(65) Prior Publication Data
US 2009/0171507 A1 Jul. 2, 2009

(30) Foreign Application Priority Data
Aug. 26, 2005 (JP) ................ 2005-245804

(51) Int. Cl.
*F16K 27/00* (2006.01)
*F16L 55/027* (2006.01)
(Continued)

(52) U.S. Cl.
CPC ......... *F16K 27/003* (2013.01); *F16L 55/02718* (2013.01); *G01F 1/36* (2013.01); *G01F 15/001* (2013.01); *G01F 15/005* (2013.01); *G05D 7/0635* (2013.01)

(58) Field of Classification Search
CPC ............ G05D 7/0635; F16L 55/02718; F16K 27/003; G01F 15/005; G01F 15/001; G01F 1/36
USPC .................................. 138/487.5, 40
See application file for complete search history.

(56) References Cited

U.S. PATENT DOCUMENTS 1,938,460 A * 12/1933 Muff ............................. 138/44
2,229,903 A    1/1941 Schmohl et al.
(Continued)

FOREIGN PATENT DOCUMENTS

JP    3-033566    2/1991
JP    06-004139    1/1994
(Continued)

OTHER PUBLICATIONS

International Search Report and Written Opinion completed Jul. 11, 2006 and mailed Jul. 25, 2006 in the corresponding international application No. PCT/JP2006/309368.
(Continued)

*Primary Examiner* — Arthur O Hall
*Assistant Examiner* — Chee-Chong Lee
(74) *Attorney, Agent, or Firm* — Griffin & Szipl, P.C.

(57) ABSTRACT

An orifice changeable pressure type flow rate control apparatus comprises a valve body of a control valve for a pressure type flow rate control apparatus installed between an inlet side fitting block provided with a coupling part of a fluid supply pipe and an outlet side fitting block provided with a coupling part of a fluid takeout pipe; a fluid inlet side of the valve body and the inlet side fitting block, and a fluid outlet side of the valve body and the outlet side fitting block are detachably and hermitically connected respectively so a flow passage for gases through the control valve is formed; and, a gasket type orifice for a pressure type flow rate control apparatus is removably inserted between a gasket type orifice insertion hole provided on the outlet side of the valve body and a gasket type orifice insertion hole of the outlet side fitting block.

11 Claims, 6 Drawing Sheets

(51) Int. Cl.
*G01F 1/36* (2006.01)
*G01F 15/00* (2006.01)
*G05D 7/06* (2006.01)

(56) References Cited

U.S. PATENT DOCUMENTS

| | | | |
|---|---|---|---|
| 3,081,942 | A | 3/1963 | Maclay |
| 3,375,845 | A | 4/1968 | Behm |
| 3,411,669 | A * | 11/1968 | Puster .............. 222/61 |
| 3,827,457 | A | 8/1974 | Vutz et al. |
| 3,830,256 | A | 8/1974 | Cox |
| 3,831,845 | A | 8/1974 | Pacht |
| 3,905,394 | A | 9/1975 | Jerde |
| 3,963,043 | A | 6/1976 | Cota et al. |
| 3,999,572 | A | 12/1976 | Mohr |
| 4,030,523 | A | 6/1977 | Cram et al. |
| 4,089,007 | A | 5/1978 | Perry et al. |
| 4,313,465 | A | 2/1982 | Holzem et al. |
| 4,431,020 | A | 2/1984 | Kowalski |
| 4,478,246 | A | 10/1984 | Sherrod |
| 4,518,011 | A | 5/1985 | Stoll |
| 4,633,911 | A * | 1/1987 | Lohn ............... 138/44 |
| 4,979,639 | A | 12/1990 | Hoover et al. |
| 5,069,252 | A * | 12/1991 | Kendrick et al. ...... 138/44 |
| 5,269,334 | A | 12/1993 | Eastman |
| 5,329,965 | A | 7/1994 | Gordon |
| 5,645,866 | A | 7/1997 | Eckardt et al. |
| 5,669,408 | A * | 9/1997 | Nishino et al. ......... 137/487.5 |
| 5,735,787 | A | 4/1998 | Lorey |
| 5,791,369 | A | 8/1998 | Nishino et al. |
| 5,816,285 | A | 10/1998 | Ohmi et al. |
| 5,875,817 | A | 3/1999 | Carter |
| 5,938,425 | A | 8/1999 | Damrath et al. |
| 6,314,992 | B1 | 11/2001 | Ohmi et al. |
| 6,422,264 | B2 | 7/2002 | Ohmi et al. |
| 6,539,968 | B1 | 4/2003 | White et al. |
| 6,591,851 | B1 | 7/2003 | Palten et al. |
| 6,997,202 | B2 | 2/2006 | Olander |

FOREIGN PATENT DOCUMENTS

| | | |
|---|---|---|
| JP | 08-087335 | 4/1996 |
| JP | 08-338546 A | 12/1996 |
| JP | 09-330128 | 12/1997 |
| JP | 10-055218 | 2/1998 |
| JP | 11-125398 | 5/1999 |
| JP | 11-265215 | 9/1999 |
| JP | 11-265216 | 9/1999 |
| JP | 2000-020135 | 1/2000 |
| JP | 2000-066732 A | 3/2000 |
| JP | 2000-322130 A | 11/2000 |
| JP | 2003-195948 A | 7/2003 |
| JP | 2004-510225 | 4/2004 |
| JP | 2004-243333 | 9/2004 |
| JP | 2004-278614 | 10/2004 |
| JP | 2005-115501 | 4/2005 |
| JP | 2005-149075 | 6/2005 |
| JP | 2005-180527 | 7/2005 |
| JP | 2004-199109 A | 10/2007 |
| WO | 02-25391 | 3/2002 |

OTHER PUBLICATIONS http://www.weisz.com/informacion/tablas%20tecnicas_pdf/Steel_grades_equivalence_table.pdf, downloaded Sep. 20, 2012.
International Search Report issued in related application PCT/JP2006/312952, completed Sep. 6, 2006 and mailed Sep. 19, 2006.
Office Action issued Jun. 28, 2012 in co-pending related U.S. Appl. No. 11/913,277.
Office Action issued in co-pending related U.S. Appl. No. 13/763,178 on Dec. 6, 2013.

* cited by examiner

PRIOR ART

GASKET TYPE ORIFICE AND PRESSURE TYPE FLOW RATE CONTROL APPARATUS FOR WHICH THE ORIFICE IS EMPLOYED

This is a National Phase Application in the United States of International Patent Application No. PCT/JP2006/309368 filed May 10, 2006, which claims priority on Japanese Patent Application No. 2005-245804, filed Aug. 26, 2005. The entire disclosures of the above patent applications are hereby incorporated by reference.

FIELD OF THE INVENTION

The present invention relates to improvements in a gasket type orifice and a pressure type flow rate control apparatus in which the orifice is employed. The present invention relates more specifically to a gasket type orifice having a high precision hole diameter for which a thin metal plate is used so that it can be manufactured at low cost, with high efficiency and also with stability; and to a pressure type flow rate control apparatus in which the gasket type orifice is employed; and to an orifice-replaceable pressure type flow rate control apparatus in which an orifice can be replaced leak-free and promptly, a flow rate range of the pressure type flow rate control apparatus can be changed easily after its field installation, and wherein the flow rate control can be maintained with high accuracy within ±1% FS (Full Scale).

TECHNICAL BACKGROUND OF THE INVENTION

Conventionally, to make an orifice it has been commonly known that an orifice hole is made directly on an orifice plate by means of mechanical processing and the like, wherein the orifice plate is interposed in a pipe passage at an appropriate position on the joint portion of the pipe passage or the connecting portion of a device and a pipe passage, and the orifice plate is directly clamped and fixed hermetically in place. However, with the afore-mentioned orifice of the directly clamped fixing type there is potential for deformation to be caused on the orifice plate due to clamping and fixing of the plate, thus making it difficult to make an orifice plate that is advantageously thin. For this reason, it is difficult to manufacture a high precision orifice having a prescribed hole diameter and shape, without uneven flow rate characteristics, and with stability and at low cost when a thin orifice plate is used.

To solve the afore-mentioned difficulties, an orifice has been developed wherein an orifice plate is welded to appropriate holding hardware, and the orifice plate welded to holding hardware is inserted into a pipe passage and fixed therein. However, with this solution there have arisen certain shortcomings such as that the orifice hole diameter may be altered by influence of heat caused at the time of welding, thermal stress might cause cracks on the thin orifice plate, and, furthermore, corrosion resistance of the orifice plate is low.

As seen above, an orifice, particularly a high precision orifice having certain constraints as to shape, hole diameter, and the like, which is employed with a pressure type flow rate control apparatus and the like cannot be manufactured at low cost, and at the same time it has been found that it is structurally difficult to insert and fix the orifice assembly in a pipe passage, thus causing various problems in practical use.

On the other hand, a pressure type flow rate control apparatus, which includes an orifice as a dispensable constituent member, has excellent characteristics in responsivity, control accuracy, manufacturing cost, maintainability and the like when compared with those same characteristics of a thermal type mass flow rate control apparatus (MFC) represented by a mass flow controller, and such as is widely used in the technical field of semiconductor manufacturing.

Figure 7:
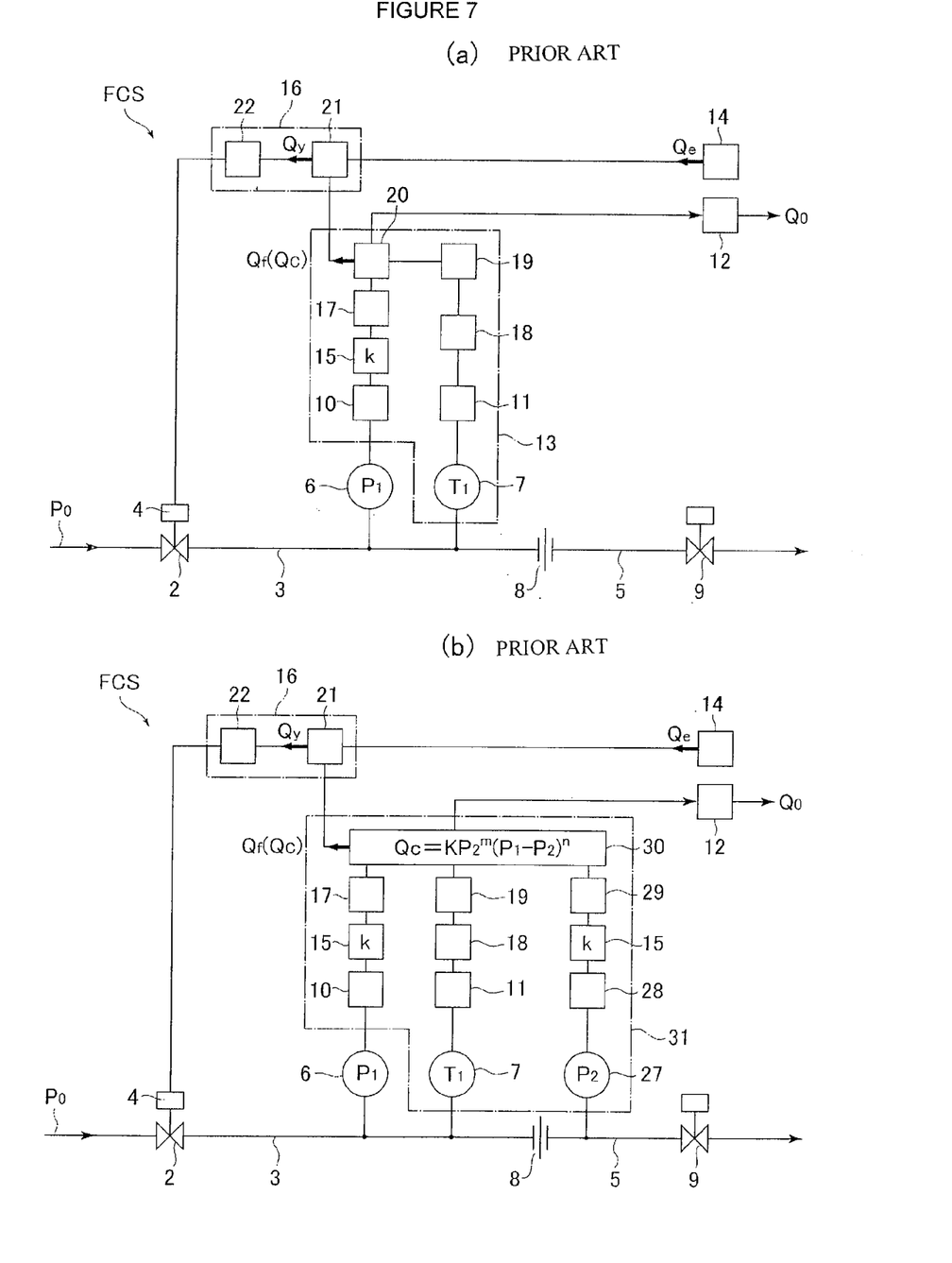

FIG. 7(a) and FIG. 7(b) show a basic block diagram of the afore-mentioned conventional pressure type flow rate control apparatus FCS The major portion of the pressure type flow rate control apparatus FCS comprises a control valve 2, a, pressure detector 6, an orifice 8, flow rate computation circuits 13, 31, a flow rate setting circuit 14, a computation control circuit 16, a flow rate output circuit 12, and the like. In FIG. 7(a) and FIG. 7(b), 3 designates an orifice upstream side pipe; 4 designates a valve actuator; 5 designates an orifice downstream side pipe; 7 designates a temperature detector; 9 designates a valve; 15 designates a flow rate conversion circuit; 10, 11, 22, 28 designate amplifiers; 17, 18, 29 designate ND converters; 19 designates a temperature correction circuit; 20, 30 designate computation circuits; 21 designates a comparison circuit; Qc designates a computation flow rate signal; Qf designates a switching computation flow rate signal; Qe designates a flow rate setting signal; Qo designates a flow rate output signal; Qy designates a flow rate control signal; Po designates gas supply pressure; $P_1$ designates orifice upstream side gas pressure; $P_2$ designates orifice downstream side gas pressure; and k designates a flow rate conversion rate.

One kind of pressure type flow rate control apparatus FCS, as shown in FIG. 7(a), is mainly used when the ratio $P_1/P_2$ of the orifice upstream side gas pressure $P_1$ and the orifice downstream side gas pressure $P_2$ is equal to the critical value of the fluid or lower than the critical value (that is, when the gas flow is under critical conditions). The gas flow rate Qc going through the orifice 8 is given by $Qc=KP_1$ (where K is a proportional constant). Another kind of pressure type flow rate control apparatus FCS, as shown in FIG. 7(b), is mainly used for the flow rate control of gas during flow conditions both in critical and non-critical conditions. The gas flow rate. Qc going through orifice 8 is given, in this case, by $Qc=KP_2^m(P_1-P_2)^n$, (where K is a proportional constant, and m and n are constants).

Furthermore, with the afore-mentioned pressure type flow rate control apparatuses, as shown in FIG. 7(a) and FIG. 7(b), the flow rate setting value for the flow rate control is given by a voltage value with a flow rate setting signal Qe. For example, when the pressure control range is 0~3 (kgf/cm² abs) for the upstream side pressure $P_1$ is provided by the voltage range 0~5 V, Qe=5V (a full scale value) becomes equivalent to the flow rate $Qc=KP_1$ in the pressure $P_1$ of 3 (kgf/cm² abs).

Specifically, if a flow rate setting signal Qe=5V is inputted when the conversion rate k of the flow rate conversion circuit 15 is set at 1, a switching computation flow rate signal Qf (Qf=kQc) becomes 5V, and a control valve 2 is operated to open or close until the upstream side pressure $P_1$ reaches 3 (kgf/cm² abs), thus resulting in that gas of a flow rate $Qc=KP_1$, corresponding to $P_1=3$(kgf/cm² abs), flows through the orifice 8.

In the case that the range of pressure to control is switched to 0~2 (kgf/cm² abs), and the pressure range is provided by the flow rate setting signal Qe of 0~5V (that is, when a full scale value of 5V gives 2(kgf/cm² abs)), the afore-mentioned flow rate conversion rate k is thus set at ⅔.

As a result, assuming that the flow rate setting signal Qe=5V is inputted, because of the requirement that Qf=kQc, the switching computation flow rate signal Qf becomes Qf=5×2/3V, and the control valve 2 is operated to open or close until the upstream side pressure $P_1$ becomes 3×2/3=2 (kgf/cm² abs). In other words, the full scale flow rate is converted so that Qe=5V shows the flow rate Qc=KP$_1$ equivalent to P$_1$=2 (kgf/cm$^2$ abs). It is also the same with the aforementioned pressure type flow rate control apparatus shown in, FIG. 7(b). In this case, the flow rate Qc of gas passing through orifice 8 is given by Qc=KP2$^m$(P$_1$-P$_2$)$^n$, (where K is a proportional constant, and m and n are constants). The afore-mentioned proportional constant K changes when the type of gases is changed.

As stated above, the conventional pressure type flow rate control apparatus is constituted so that the flow rate Qc=KP$_1$, under the orifice upstream side pressure P$_1$ corresponding to Qe=5V (full scale•F.S.), can be switched by adjusting the conversion rate k of the flow rate conversion circuits 15. However, the flow rate switching range is strictly limited to within the range of the flow rate smaller than the flow rate Qc=KP$_1$ under the upstream side pressure P$_1$ corresponding to the afore-mentioned Qe=5V (F.S. value), and the flow rate Qc under the upstream side pressure P$_1$ becomes the flow rate value unequivocally determined by a constant k obtained given a particular orifice diameter, and the like.

In other words, in order for the pressure control range 0~3 (kgf/cm$^2$ abs) under the orifice upstream side pressure P$_1$ to be provided by the voltage range 0~5V, and the flow rate value Qc at Qe=5V is switched up to the flow rate, for example, 5 times, it becomes necessary that the orifice itself needs to be changed to a new orifice corresponding to a constant K having a value 5 times that of the previous orifice.

Figure 8:
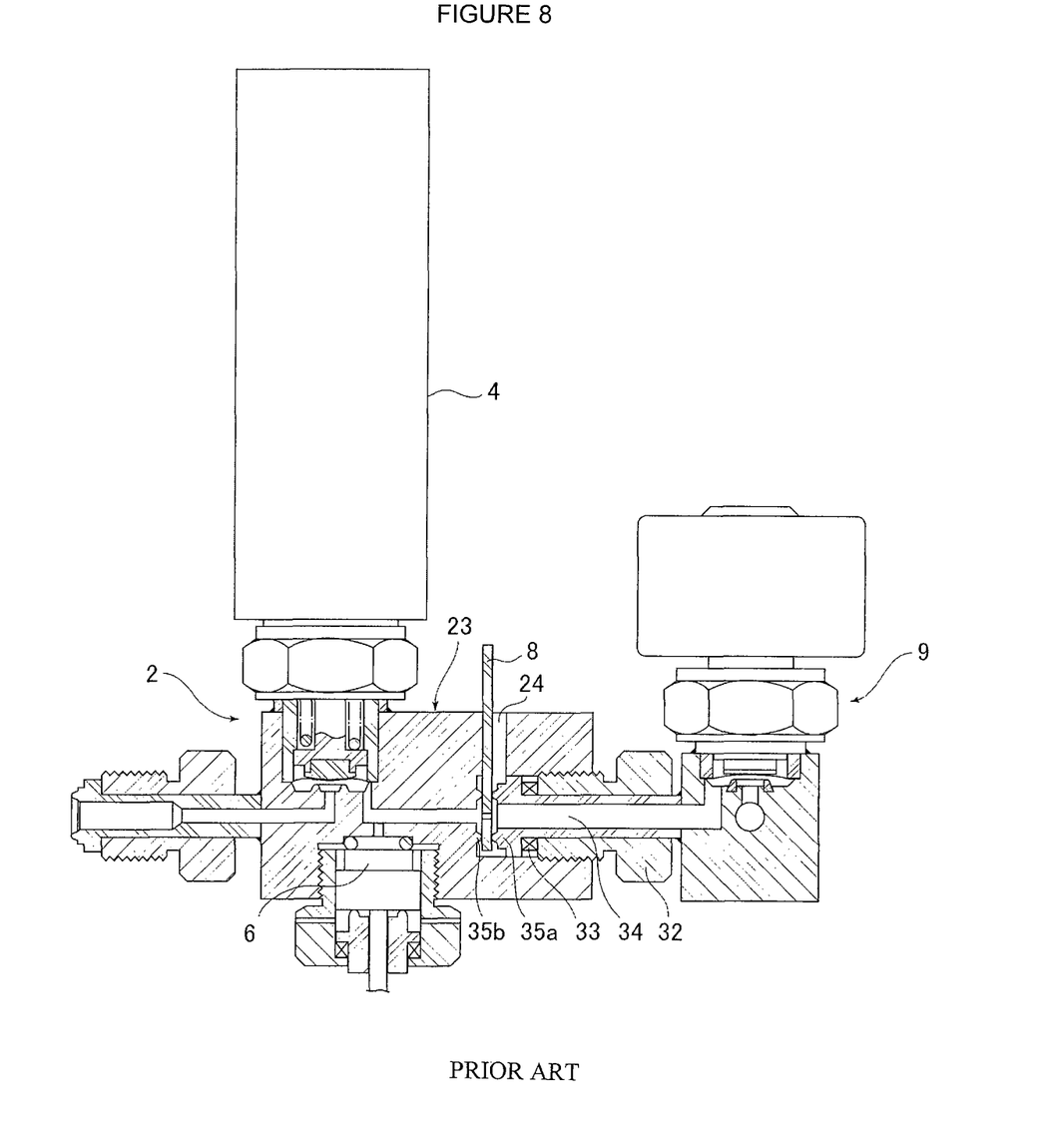
FIG. 8 is a cross sectional schematic diagram illustrating an example of a conventional orifice changeable pressure type flow rate control apparatus.

FIG. 8 shows an example of the afore-mentioned pressure type flow rate control apparatus, which has structure making it possible to replace the orifice, wherein an orifice insertion hole 24 is provided on the fluid outlet side of a valve body 23 of the control valve 2, which forms a pressure type flow rate control apparatus FCS. With this structure, an orifice 8 having an appropriate diameter is inserted into the orifice insertion hole 24, and hermeticity of the fluid passage 34 is secured through the mediation of pressing metal ware 32, a bearing 33 and a sealing material 35a.

Patent Document 1: TOKU-KAI-HEI No. 8-338546
Patent Document 2: TOKU-KAI No. 2000-66732
Patent Document 3: TOKU-KAI No. 2000-322130
Patent Document 4: TOKU-KAI No. 2003-195948
Patent Document 5: TOKU-KAI No. 2004-199109

Now, with the afore-mentioned conventional pressure type flow rate control apparatuses, as shown in FIG. 7(a) and FIG. 7(b), because supply pressure Po for the fluid to be controlled is ordinary maintained at a set value, the maximum value Qc of the flow rate to be control is unequivocally determined by the orifice 8 that will be used. So, unless the orifice itself is replaced, it is difficult to change the maximum or minimum flow rate Qc of the afore-mentioned fluid in a large scale.

Also, according to the apparatus of FIG. 8, it is necessary that the pressing metal ware 32 be removed each time the orifice 8 is replaced, and in some cases when the sealing material 35a is changed. However, to dismantle the piping passage is time consuming and difficult.

Furthermore, when using the orifice replacement method in accordance with the apparatus of FIG. 8, it is very difficult to completely prevent an outside leak from the so-called orifice sealing part because the apparatus is constituted so that the sealing mechanism of orifice 8 comprises the sealing material 35a attached to the surface side of the orifice 8 and the touching seat 35b for sealing on the valve main body side attached to the reverse face side of the orifice 8. Furthermore, the sealing characteristics of both faces of the orifice 8 are secured by the screw-in pressing pressure of the pressing metal ware 32.

In addition, another shortcoming is that the orifice plate cannot be very thin because, as stated before, the orifice 8 is directly clamped and fixed in place as shown in FIG. 8. Thus, to machine-process a very thin metal made orifice plate to make the orifice with a prescribed inside diameter thereon is difficult to manufacture with both a high-precision orifice and at low cost.

Another difficulty is, as stated before, that distortion, cracks, corrosion, and the like, caused on the orifice plate by weld heat cannot be prevented even though the orifice plate is constituted so that orifice holding metal ware is welded to a thin orifice plate, and the orifice holding metal ware is positioned and fixed.

OBJECT OF THE INVENTION

It is a primary object of the present invention to solve the afore-mentioned shortcomings of a conventional orifice and a pressure type flow rate control apparatus in which the orifice is used, namely, (a) that it is difficult to manufacture an orifice having a prescribed diameter and shape, and also having stable flow rate characteristics, by using a thin orifice plate, (b) that deformation of the orifice and cracks on the orifice plate can be easily caused by manufacturing a welding type orifice due to thermal stress, (c) that with a pressure type flow rate control apparatus, in which an orifice is used, it is difficult to substantially enlarge a flow rate range by only changing a conversion rate k of the flow rate computation circuit, and (d) that with a conventional orifice replacement type assembly, it takes much time to replace the orifice, and there exists a high risk that an outside leak will be caused, and the like. Another primary object of the present invention is to provide an orifice that makes it possible to secure highly accurate, stable flow rate characteristics by using a very thin orifice plate, and that the orifice is held and fixed to the inside of a fluid passage easily and leak free, and that the orifice is manufactured at low cost and with ease. It is another primary object of the present invention to provide a pressure type flow rate control apparatus for which the orifice is used, and at the same time, to provide an orifice replaceable pressure type flow rate control apparatus that allows, even after shipment from a factory, for the flow rate range to be changed easily and promptly at a worksite by replacing the orifice 8. Yet another primary object of the present invention is to completely eliminate outside leaks from the orifice 8, and to remarkably enhance flow rate control accuracy.

SUMMARY OF THE INVENTION

A gasket type orifice, in accordance with a first embodiment of the present invention, is basically constituted so that an orifice base (38a) equipped with a convex portion (38a$_1$) for fitting and an orifice base (38b) equipped with a concave portion (38b$_1$) for fitting are combined, and an orifice plate (38c) is hermetically inserted between the end faces of both orifice bases, and both end faces (38a$_3$), (38b$_3$) of both orifice bases (38a), (38b) are made to be sealing faces for the gasket type orifice.

A gasket type orifice, in accordance with a second embodiment of the present invention, is basically constituted so that a brim portion (38d$_1$) projected inwardly in the inside in the vicinity of one side of a short cylinder-shaped orifice base (38d) for which end faces of both sides are made to be sealing faces, and a thin orifice plate (38c) equipped with an orifice hole on the outside face of the brim portion (38d$_1$), are laser-welded and fixed over the entire periphery of the brim portion and the thin orifice plate.

A pressure type flow rate control apparatus, in accordance with a third embodiment of the present invention, is basically constituted so that a pressure type flow rate control apparatus (A) is equipped with a control valve, a pressure detector, an orifice, a flow rate computation circuit and a computation control circuit, and the afore-mentioned orifice is made to be a gasket type orifice in accordance with either the first embodiment or the second embodiment of the present invention.

The invention, in accordance with a fourth embodiment of the invention, is made so that a pressure type flow rate control apparatus, in accordance with a third embodiment of the invention, includes a valve body (23) of a control valve, which forms the pressure type flow rate control apparatus (A), that is hermetically connected with an inlet side block (40) having a fluid flow passage (40a), a center block (41) equipped with a valve seat (2b), and an outlet side block (42) equipped with an outlet side fluid passage (42a).

The invention, in accordance with a fifth embodiment, is made so that a pressure type flow rate control apparatus, in accordance with a fourth embodiment, includes an installation position of the orifice, of the pressure type flow rate control apparatus (A), disposed between the fluid outlet side of the center block (41) of the control valve and the fluid inlet side of the outlet side fitting block (42).

An orifice changeable pressure type flow rate control apparatus, in accordance with a sixth embodiment of the present invention, is basically constituted so that a valve body 23 of a control valve 2 for a pressure type flow rate control apparatus A is installed between an inlet side fitting block 39 equipped with a coupling portion for a fluid supply pipe and an outlet side fitting block 43 equipped with a coupling portion for a fluid takeout pipe; the fluid inlet side of the valve body 23 and the afore-mentioned fluid outlet side of the inlet side fitting block 39, and also the afore-mentioned fluid outlet side of the valve body 23 and the afore-mentioned fluid inlet side of the outlet side fitting block 43 are hermetically connected with detachability, respectively, thus forming a flow passage for gases through the afore-mentioned control valve 2, and a gasket type orifice 38 of the pressure type flow rate control apparatus A is removably inserted between a gasket type orifice insertion hole 42c provided on the outlet side of the afore-mentioned valve body 23 and a gasket type orifice insertion hole 43b provided on the fluid inlet side of the outlet side fitting block 43.

The invention, in accordance with a seventh embodiment, is constituted so that an orifice changeable pressure type flow rate control apparatus, in accordance with a sixth embodiment, further includes a valve body 23 of the control valve 2, which forms a pressure type flow rate control apparatus A, and that is hermetically connected with the inlet side block 40 having a fluid flow passage 40a, a center block 41 equipped with a valve seat 2b, and an outlet side block 42 equipped with an outlet side fluid passage 42a.

The invention, in accordance with an eighth embodiment, is constituted so that an orifice changeable pressure type flow rate control apparatus, in accordance with the seventh embodiment, further includes a pressure detector insertion hole 41e provided into which to insert a pressure detector 6 of the pressure type flow rate control apparatus A on the center block 41.

EFFECTS OF THE INVENTION

A gasket type orifice 38 with regard to the first embodiment of the present invention is constituted so that an orifice plate 38c is closely fitted with hermeticity between both orifice bases 38a, 38b. This makes it possible for the orifice to be caught between both orifice bases 38a, 38b without causing deformation, and the like, even when the orifice plate is made of a very thin metal plate or a metal film. As a result, it is possible to use the orifice plate 38c, having an orifice hole, with very high accuracy, and the orifice 38 itself, as a gasket, can be clamped and fixed closely to a pipe passage and the like by utilizing the outside ends of both orifice bases as seal faces.

A gasket type orifice 38, in accordance with the second embodiment of the invention, is constituted so that the entire periphery of an orifice plate 38c is laser-welded to the outside face of the brim portion $38d_1$. Therefore, just as the case of the first embodiment of the invention, a gasket type orifice 38 having an orifice hole can be manufactured with very high accuracy and without occurrence of thermal distortion on the orifice plate 38c.

In accordance with a pressure type flow rate control apparatus in accordance with the third embodiment of the present invention, a gasket type orifice 38, in accordance with the first or second embodiments of the invention, is used, thus making it possible to make the orifice 38 itself to be highly accurate, and to secure hermeticity and to nearly completely prevent distortion when the orifice 38 is fixed in place.

In accordance with an orifice changeable pressure type flow rate control apparatus in accordance with the sixth embodiment of the present invention, the orifice can be changed with extreme ease, and hermeticity secured, and distortion nearly completely prevented at the time the orifice is fixed into place. This feature of the invention makes it possible for highly accurate flow rate control to be performed.

BRIEF DESCRIPTION OF THE DRAWINGS

FIGS. 7 (a) and (b) are block explanatory drawings of conventional pressure type flow rate control apparatuses.

LIST OF REFERENCE CHARACTERS AND NUMERALS

A Orifice changeable pressure type flow rate control apparatus
1 Control part
2 Control valve
2a Valve body
2b Valve seat
6 Pressure detector
23 Valve body
35 Gasket
36 Gasket type filter
37 Gasket 38 Gasket type orifice
38a Orifice base (first)
38$a_1$ Convex fitting portion
38$a_2$ Outer peripheral face
38$a_3$ Upper end face
38b Orifice base (second)
38$b_1$ Concave fitting portion
38$b_2$ Inside peripheral face
38$b_3$ Lower end face
38c Orifice plate
38d Orifice base
38$d_1$ Brim portion
39 Inlet side fitting block
39a Fluid passage
40 Inlet side block
40a Fluid passage
40b Leak check hole
40c Gasket insertion hole
41 Center block
41a Inlet side fluid passage
41b Outlet side fluid passage
41c Valve body insertion hole
41d Gasket insertion hole
41e Pressure detector insertion hole
42 Outlet side block
42a Fluid passage
42b Leak check hole
42c Gasket type orifice insertion hole
43 Outlet side fitting block
43a Fluid passage.
43b Gasket type orifice insertion hole
44 Fixture for a pressure detector
45 Fixing bolt for a pressure detector

BEST MODE TO IMPLEMENT THE INVENTION

Figure 1:
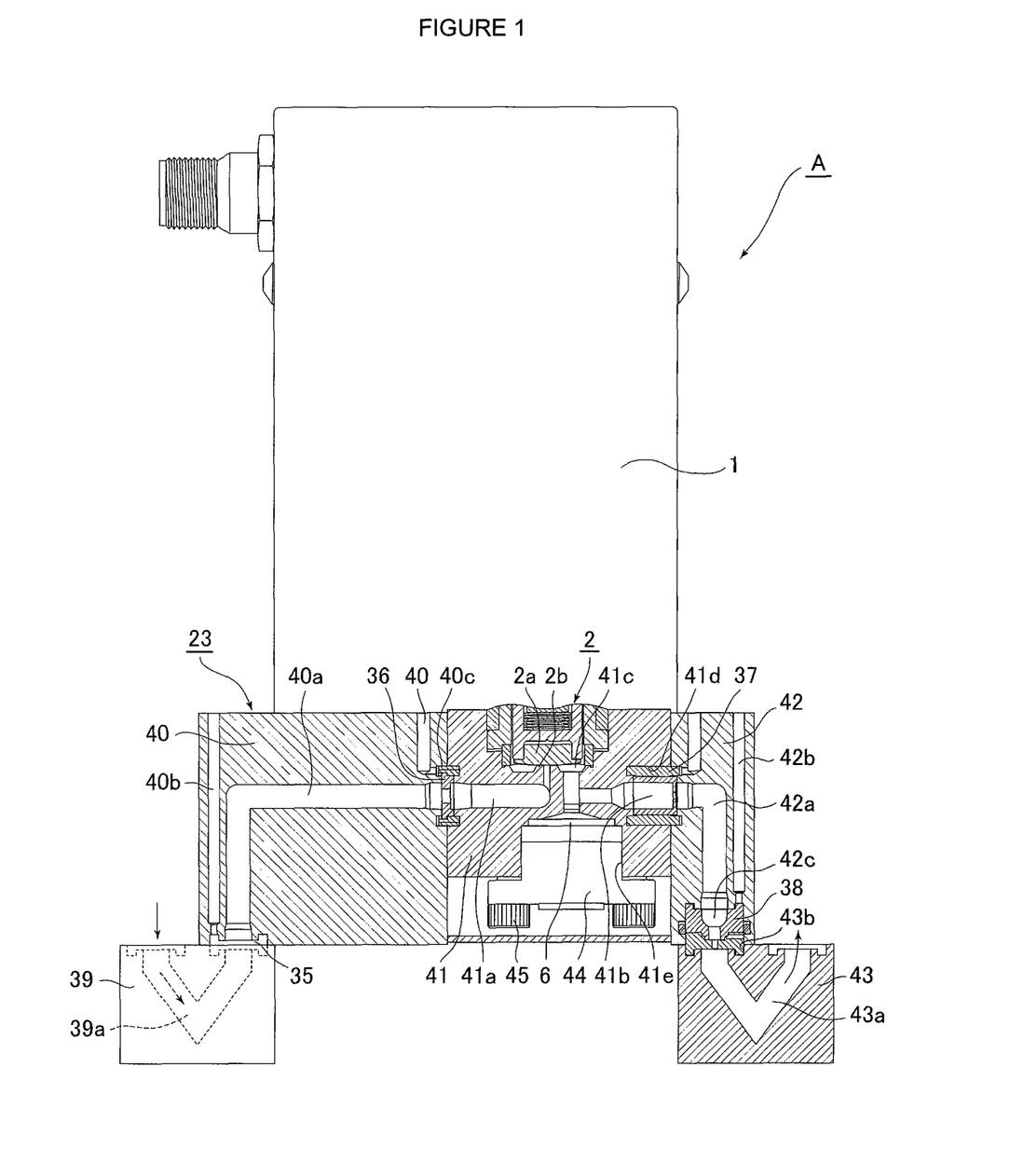
FIG. 1 is a front view in cross section of a major part of an orifice changeable pressure type flow rate control apparatus.

An embodiment in accordance with the present invention is described as follows with reference to the drawings. FIG. 1 is a front view in cross section of a major part of an orifice changeable pressure type flow rate control apparatus A in accordance with the sixth embodiment of the present invention. As shown with FIG. 1, 1 designates a control part, 2 designates a control valve, 2a designates a valve body of the control valve, 2b designates a valve seat, 23 designates a valve body, 35 designates a gasket, 36 designates a gasket type filter, 6 designates a pressure detector, 37 designates a gasket, and 38 designates a gasket type orifice.

The afore-mentioned valve body 23 is formed by assembling three members, namely: an inlet side block 40, a center block 41 and an outlet side block 42. The inlet side fitting block 39 and the inlet side block 40 are connected by a fixing bolt (not illustrated) through the mediation of a gasket 35.

The afore-mentioned inlet side block 40 and center block 41 are also connected by a fixing bolt (not illustrated) through the mediation of the gasket type filter 36. The afore-mentioned center block 41 and outlet side block 42 are connected by a fixing bolt (not illustrated) through the mediation of gasket 37. Furthermore, the afore-mentioned outlet side block 42 and outlet side fixing block 43 are hermetically and detachably connected and fixed together by a fixing bolt (not illustrated) through the mediation of a gasket type orifice 38.

The afore-mentioned blocks 39 to 43 are all made of SUS316L-P (W melt) material. A flow-in side pipe fitting (not illustrated), a fluid passage 39a, a fixing bolt screw-in hole (not illustrated) and the like are formed in the inlet side fixing block 39. Also, the fluid passage 40a, the fixing bolt insertion hole (not illustrated), a leak check hole 40b, a gasket insertion hole 40c and the like are formed in the afore-mentioned inlet side block 40. Furthermore, an inlet side fluid passage 41a, an outlet side fluid passage 41b, an insertion hole 41c (i.e., for a valve body 2a) equipped with a valve seat 2b, a gasket insertion hole 41d, a pressure detector insertion hole 41e, a fixing bolt screw-in hole (not illustrated), and the like, are formed in the center block 41.

An outlet side fluid passage 42a, a leak check hole 42b, an orifice gasket insertion hole 42c positioned on the fluid outlet side, a fixing bolt insertion hole (not illustrated), and the like, are formed in the afore-mentioned outlet side block 42. The afore-mentioned outlet side fixing block 43 is provided with an outlet side pipe fitting (not illustrated), a fluid passage 43a, and a fixing bolt screw-in hole (not illustrated) formed therein, which configuration is constituted to be similar to that of the afore-mentioned inlet side fixing block 39. The only difference between the afore-mentioned inlet side fixing block 39 and the outlet side fixing block 43 is that the insertion hole 43c for a gasket type orifice 38 is formed in the fluid inlet side.

As further shown with FIG. 1, 44 designates a fixture for a pressure detector and 45 designates a fixing bolt for the pressure detector.

Figure 2:
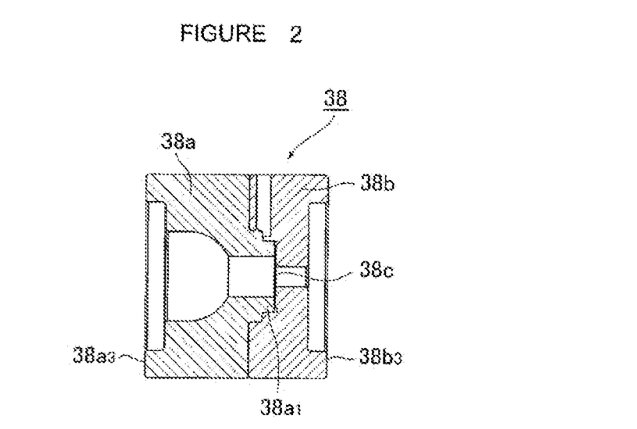
FIG. 2 is a cross sectional schematic diagram of a gasket type orifice in accordance with a first embodiment of the present invention.
Figure 3:
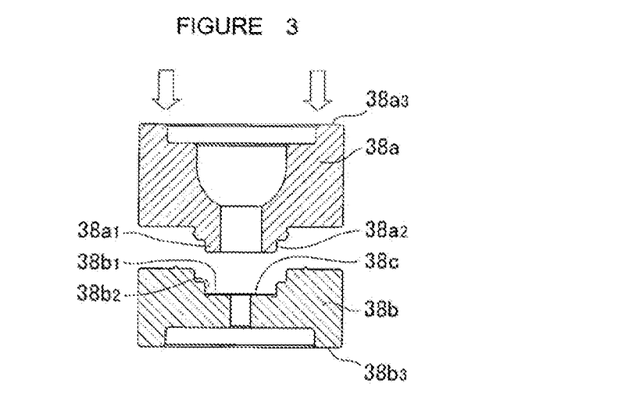
FIG. 3 is an explanatory drawing of a manufacturing method for the gasket type orifice shown in FIG. 2.

FIG. 2 is a schematic cross sectional diagram to illustrate one example of a gasket type orifice in accordance with the first embodiment of the present invention, which has been manufactured by the so-called press-fitting method. In particular, the gasket type orifice 38 is provided with a round-shaped orifice plate 38c having a desired orifice diameter φ disposed between a first orifice base 38a and a second orifice base 38b, is formed by press-fitting the orifice base 38a into the orifice base 38b using a press machine with a thrust force of approximately 90N, as shown in FIG. 3, so that both orifice bases are hermetically integrated and adhered together. The major members 38a, 38b, and 38c constituting the gasket type orifice are all made of SUS316-LM (W melt).

The gasket type orifice 38 is used with both a pressure type flow rate control apparatus in accordance with the third embodiment of the present invention, and with an orifice changeable pressure type flow rate control apparatus in accordance with the sixth embodiment of the present invention.

In particular, as shown in FIG. 2 and in FIG. 3, an orifice base 38a has an extruded fitting part 38$a_1$ disposed on the disc-shaped lower end face, and an outer peripheral face 38$a_2$ is closely contacted hermetically with the inner wall face 38$b_2$ of the recessed fitting part 38$b_1$ formed on the upper end face of the other disc-shaped orifice base 38b so that the orifice plate 38c is hermetically fitted and maintained between the end faces of the first base 38a and the second base 38b. It goes without saying that the ring-shaped upper end face 38$a_3$ and the ring-shaped lower end face 38b3 of the assembled gasket type orifice 38 function as seal faces of the seal gasket between blocks 42, 43, respectively.

Figure 4:
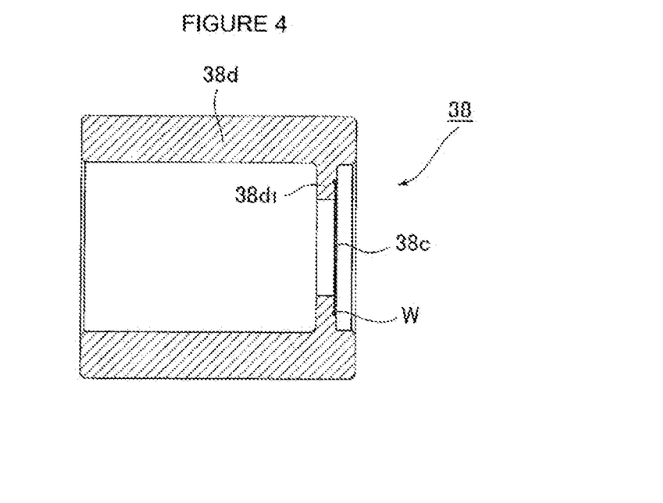
FIG. 4 is a cross sectional schematic diagram of a gasket type orifice in accordance with a second embodiment of the present invention.

FIG. 4 illustrates a gasket type orifice 38 in accordance with the second embodiment of the present invention. The gasket type orifice is formed by means of an orifice plate 38c that is laser-welded W to an entire periphery of the outside face of the brim part 38$d_1$ installed on one side of the inside of orifice base 38d, thus making the upper end face and the lower end face of a cylinder-shaped orifice base 38d seal faces, respectively. The orifice base 38d is made of SUS316L-LM (W melt), and the same quality as that of the orifice base 38d or some other Ni—Cr alloys are used for the orifice plate 38c, which is equipped with an orifice hole having a prescribed inner diameter φ in the center.

Figure 5:
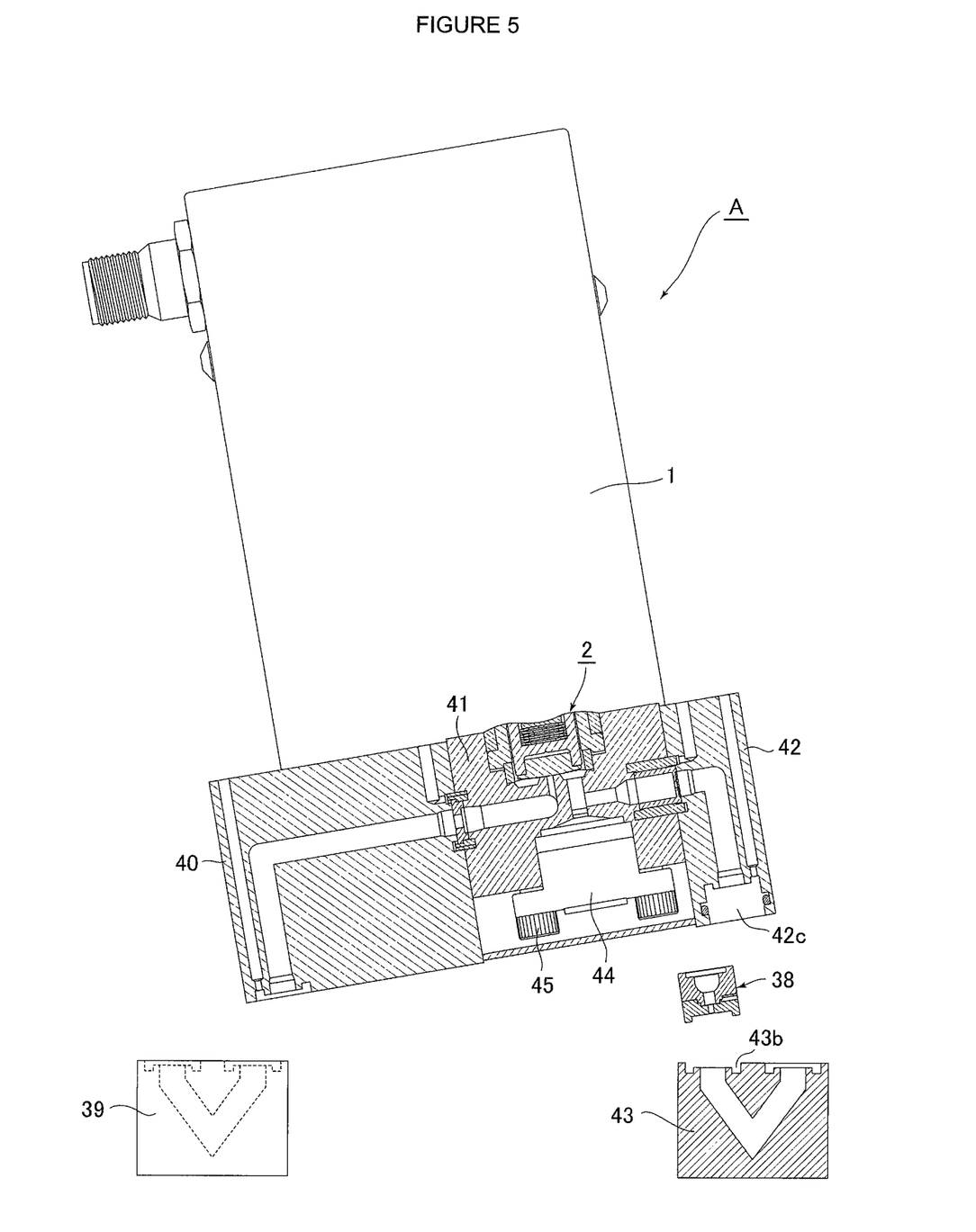
FIG. 5 is an explanatory drawing illustrating replacement of a gasket type orifice.

Next, replacement (or exchange) of the gasket type orifice 38 is explained as follows. When a need to replace the gasket type orifice 38 occurs, for example, due to changes of the flow rate of gases to be controlled or there is a change in the type of gases to be used, and the like, first, as shown in FIG. 5, fixing bolts (not illustrated•4 pieces) connecting the inlet side block 40 and the inlet side fixing block (an inlet side base block) 39, and fixing bolts (not illustrated•4 pieces) connecting the outlet side block 42 and the outlet side fixing block (an outlet side base block) 43, are removed.

Next, a new gasket type orifice 38 is inserted inside the gasket insertion hole 42c of the afore-mentioned outlet side block 42, and both blocks 40, 42 are, then, fixed to the fixing blocks 39, 43 respectively as before.

It is not necessary at all for the piping systems to be removed at the time of the gasket type orifice 38 is replaced because the gas inlet side pipe and the gas outlet side pipe are both connected to the connecting joints of the inlet side fixing block 39 and the outlet side fixing block 43, respectively, and both blocks 39, 43 are not moved at all.

Figure 6:
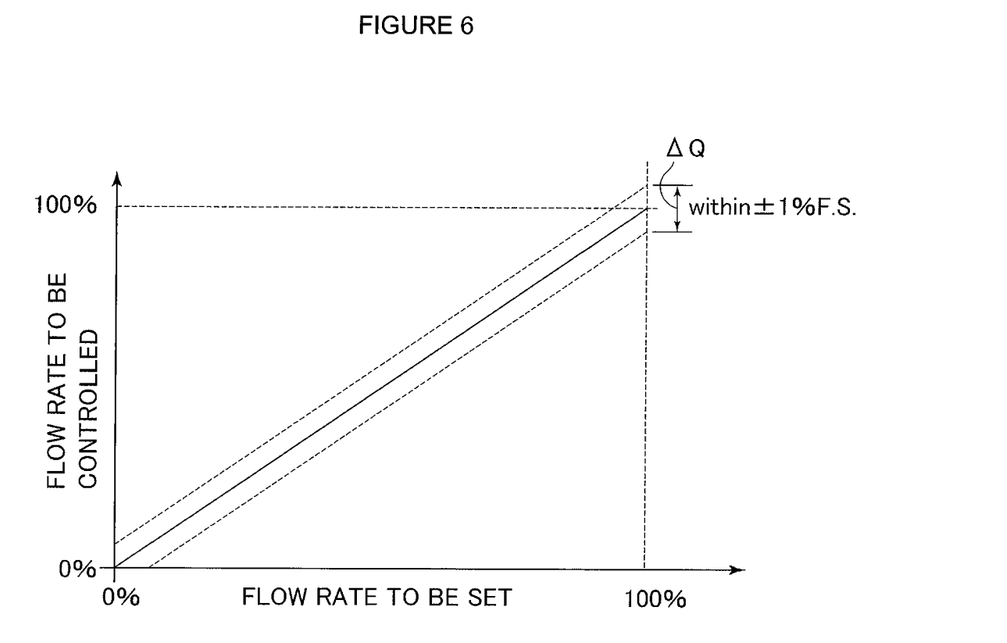
FIG. 6 is an explanatory drawing of the correction of flow rate accuracy after the gasket type orifice is replaced.

Upon completion of replacement of the afore-mentioned gasket type orifice 38, the flow rate to be set and the flow rate to be controlled are newly adjusted. For example, as shown in FIG. 6, when a span error $\Delta Q$ exceeds specified values (e.g. ±5% F.S.), or when there is a need to maintain span error $\Delta Q$ below specified values (e.g. ±1% F.S.), data concerning a constant K essential to the gasket type orifice 38, after it is replaced, are required to be registered to a control part through mediation of an orifice data reader, and the flow rate span error $\Delta Q$ and the flow rate linear error (not illustrated) are corrected by using data concerning a constant K essential to the gasket type orifice 38, after it is replaced, so that span error $\Delta Q$ and the like are corrected to be below the prescribed values.

FEASIBILITY OF INDUSTRIAL USE

The present invention is applicable to all fluid equipment for which an orifice is used, and to fluid flow rate control apparatuses which are so constituted so that flow rate control of fluids is performed by using an orifice, and is mainly utilized in fields such as semiconductor manufacturing, chemical industry, pharmaceutical industry, food processing industry, and the like.

What is claimed is:

1. A gasket type orifice device, comprising:
   (a) a first orifice base made of metal and provided with a complementary convex two-step sealing structure;
   (b) a second orifice base made of metal and provided with a complementary concave two-step sealing structure; and
   (c) an orifice plate provided with an orifice hole formed therein, and disposed between the complementary convex two-step sealing structure and the complementary concave two-step sealing structure,
   wherein the convex and concave two-step sealing structures are complementary to one another and hermetically sealable about the orifice plate when force is applied to the first and second orifice bases by a plurality of blocks, and
   wherein the first orifice base, the second orifice base and the orifice plate are all made of the same Ni—Cr alloy material.

2. A gasket type orifice device as claimed in claim 1, wherein the first orifice base and the second orifice base are connected together so that the first orifice base is press-fitted into the second orifice base.

3. A gasket type orifice device as claimed in claim 1, wherein the plurality of blocks include a first metal block and a second metal block, wherein the gasket type orifice device is sealed between the first metal block facing the upper end face of the second orifice base and the second metal block facing the lower end face of the first orifice base.

4. A pressure type flow rate control apparatus comprising:
   a control valve disposed to control flow of a fluid through a fluid passage;
   a pressure detector disposed to detect pressure in the fluid passage;
   an orifice disposed in the fluid passage; and
   a flow rate computation circuit and a computation control circuit operatively connected to receive pressure data from the pressure detector and to generate a flow rate control signal used to control opening and closing of the control valve, wherein the orifice is a gasket type orifice device according to claim 1.

5. A pressure type flow rate control apparatus as claimed in claim 4, wherein the control valve includes a valve body comprising
   an inlet side block having an inlet side fluid flow passage formed therein;
   a center block equipped with a valve seat, wherein the center block is hermetically connected to the inlet side block; and
   an outlet side block having an outlet side fluid passage formed therein, wherein the outlet side block is hermetically connected to the center block.

6. A pressure type flow rate control apparatus as claimed in claim 5, further comprising an installation position for receiving the gasket type orifice device, wherein the installation position is disposed between a fluid outlet side of the center block of the control valve and a fluid inlet side of an outlet side fitting block.

7. An orifice changeable pressure type flow rate control apparatus comprising:
   an inlet side fitting block equipped with a coupling portion for a fluid supply pipe;
   an outlet side fitting block equipped with a coupling portion for a fluid takeout pipe;
   a control valve comprising a valve body, wherein the valve body is installed between the inlet side fitting block and the outlet side fitting block, wherein a fluid inlet side of the valve body and a fluid outlet side of the inlet side fitting block, and a fluid outlet side of the valve body and a fluid inlet side of the outlet side fitting block, respectively, are hermetically and detachably connected so as to form a flow passage so one or more gases flow through to the control valve; and
   a gasket type orifice device according to claim 1, wherein the gasket type orifice device is removably inserted between a gasket type orifice insertion hole provided on the fluid outlet side of the valve body and a gasket type orifice insertion hole provided on the fluid inlet side of the outlet side fitting block, wherein the valve body of the control valve comprises
   an inlet side block having an inlet side fluid passage formed therein;
   a center block equipped with a valve seat, wherein the center block is hermetically connected to the inlet side block; and
   an outlet side block having an outlet side fluid passage formed therein, wherein the outlet side block is hermetically connected to the center block.

8. An orifice changeable pressure type flow rate control apparatus as claimed in claim 7, wherein a pressure detector insertion hole is provided on the center block and a pressure detector is inserted in the pressure detector insertion hole so that the pressure detector is disposed to detect pressure of one or more gases flowing through the control valve.

9. An orifice changeable pressure type flow rate control apparatus comprising:
- an inlet side fitting block equipped with a coupling portion for a fluid supply pipe;
- an outlet side fitting block equipped with a coupling portion for a fluid takeout pipe;
- a control valve comprising a valve body, wherein the valve body is installed between the inlet side fitting block and the outlet side fitting block, wherein a fluid inlet side of the valve body and a fluid outlet side of the inlet side fitting block, and a fluid outlet side of the valve body and a fluid inlet side of the outlet side fitting block, respectively, are hermetically and detachably connected so as to form a flow passage so one or more gases flow through to the control valve; and
- a gasket type orifice device according to claim 1, wherein the gasket type orifice device is removably inserted between a gasket type orifice insertion hole provided on the fluid outlet side of the valve body and a gasket type orifice insertion hole provided on the fluid inlet side of the outlet side fitting block.

10. An orifice changeable pressure type flow rate control apparatus as claimed in claim 9, wherein the valve body of the control valve comprises
- an inlet side block having an inlet side fluid passage formed therein;
- a center block equipped with a valve seat, wherein the center block is hermetically connected to the inlet side block; and
- an outlet side block having an outlet side fluid passage formed therein, wherein the outlet side block is hermetically connected to the center block.

11. An orifice changeable pressure type flow rate control apparatus as claimed in claim 10, wherein a pressure detector insertion hole is provided on the center block and a pressure detector is inserted in the pressure detector insertion hole so that the pressure detector is disposed to detect pressure of one or more gases flowing through the control valve.

* * * * *